(12) United States Patent
Foltz et al.

(10) Patent No.: US 6,431,228 B2  
(45) Date of Patent: Aug. 13, 2002

(54) SPRING-LOADED CONTAMINANT COVER FOR TANK FILLER NECK CLOSURE ASSEMBLY

(75) Inventors: Dean C. Foltz, Shelbyville; Jason K. Jobe, Glenwood, both of IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/852,814

(22) Filed: May 10, 2001

Related U.S. Application Data
(60) Provisional application No. 60/202,576, filed on May 10, 2000.

(51) Int. Cl.⁷ ................................................ B65B 1/04
(52) U.S. Cl. ...................... 141/301; 141/350; 220/86.2; 220/DIG. 33; 296/97.22
(58) Field of Search ................................. 141/301, 302, 141/349, 350; 220/86.2, DIG. 33; 296/97.22

(56) References Cited

U.S. PATENT DOCUMENTS

| | | | |
|---|---|---|---|
| 1,978,314 A | | 10/1934 | Lancaster |
| 2,054,145 A | | 9/1936 | Tandy |
| 2,663,447 A | * | 12/1953 | Westcott |
| 3,750,825 A | | 8/1973 | Bachle |
| 4,498,600 A | | 2/1985 | Blion |
| 4,527,825 A | | 7/1985 | Clouse |
| 4,886,182 A | | 12/1989 | Fedelem et al. |
| 5,165,749 A | | 11/1992 | Sheppard |
| 5,234,122 A | | 8/1993 | Cherng |
| 5,437,317 A | | 8/1995 | Takatsuka et al. |
| 5,437,491 A | | 8/1995 | Nedbal et al. |
| 5,462,190 A | | 10/1995 | Lienhart et al. |
| 5,580,258 A | | 12/1996 | Wakata |
| 5,658,036 A | | 8/1997 | Benoist |
| 5,735,424 A | | 4/1998 | Diedericks, Jr. et al. |
| 5,954,387 A | * | 9/1999 | Fisher |
| 6,189,581 B1 | * | 2/2001 | Harris et al. |
| 6,193,093 B1 | * | 2/2001 | Brunner |

FOREIGN PATENT DOCUMENTS
WO    WO 98/45183    10/1998

* cited by examiner

Primary Examiner—Steven O. Douglas  
(74) Attorney, Agent, or Firm—Barnes & Thornburg

(57) ABSTRACT

An apparatus for use with a filler neck of a vehicle includes a filler neck access door adapted to be coupled to a side wall of the vehicle, a filler neck closure that is adapted to be coupled to an open mouth of the filler neck to close the open mouth and includes a first seal configured to block fuel and fuel vapor from flowing from the filler neck to atmosphere, and a cover configured to cover the filler neck closure upon closure of the filler neck access door. The cover includes a second seal and a seal support coupled to the second seal and the filler neck access door. The seal support yieldably biases the second seal into engagement with the filler neck closure upon closure of the filler neck access door.

17 Claims, 2 Drawing Sheets

SPRING-LOADED CONTAMINANT COVER FOR TANK FILLER NECK CLOSURE ASSEMBLY

This application claims priority under 35 U.S.C. §119(e) to U.S. Provisional Application Ser. No. 60/202,576, filed May 10, 2000, which is expressly incorporated by reference herein.

BACKGROUND AND SUMMARY OF THE INVENTION

The present invention generally relates to a filler neck closure assembly for a vehicle fuel tank, and particularly to a contaminant cover for closing a capless fuel tank filler neck. More particularly, the present invention relates to a closure assembly suitable for use with a robotic refueling system.

A removable fuel cap with a sealing gasket is typically used to close the open end of a fuel tank filler neck. It has been observed that fuel caps are often lost or damaged over time and, as a result, the open end of the filler neck might not be closed and sealed in accordance with the original equipment specifications during operation of the vehicle.

A robotic refueling system operates to detect a vehicle arriving at a vehicle-refueling station, open the vehicle fuel tank filler neck access door, locate a fuel tank filler neck in the vehicle, insert a fuel-dispensing nozzle automatically into the filler neck to introduce fuel in the fuel tank of the vehicle, withdraw the fuel dispensing nozzle after refueling, and close the filler neck access door, all without any intervention by an attendant. The filler neck closure assembly in accordance with the present disclosure is particularly suited for use with such robotic refueling systems.

According to the present disclosure, an apparatus for use with a filler neck of a vehicle includes a filler neck access door, a filler neck closure, and a cover. The filler neck access door is adapted to be coupled to a side wall of the vehicle and is movable between a closed position to block access to the filler neck and an opened position to allow access to the filler neck. The filler neck closure is adapted to be coupled to an open mouth of the filler neck to close the open mouth. The filler neck closure includes a first seal configured to block fuel and fuel vapor from flowing from the filler neck to atmosphere and is formed to include a nozzle-receiving opening. The cover includes a second seal and a seal support coupled to the second seal. The seal support includes a base coupled to the filler neck access door and a spring. The spring is configured to bias the second seal away from the base to cause the second seal to seat on the filler neck closure to block contaminant material from entering the nozzle-receiving opening when the filler neck access door is in its closed position. The spring is further configured to allow the second seal to move toward the base in response to the second seal seating on the filler neck closure.

In preferred embodiments, the seal support further includes a plate coupled to the second seal and a post coupled to the base and the plate. The spring engages the base and the plate and surrounds the post. The plate and the second seal are formed to include openings through which the post extends so that the plate and the second seal are movable along the post relative to the base to compensate for variances in the position of the filler neck closure relative to the filler neck access door upon closure thereof and the position of the filler neck in the vehicle.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
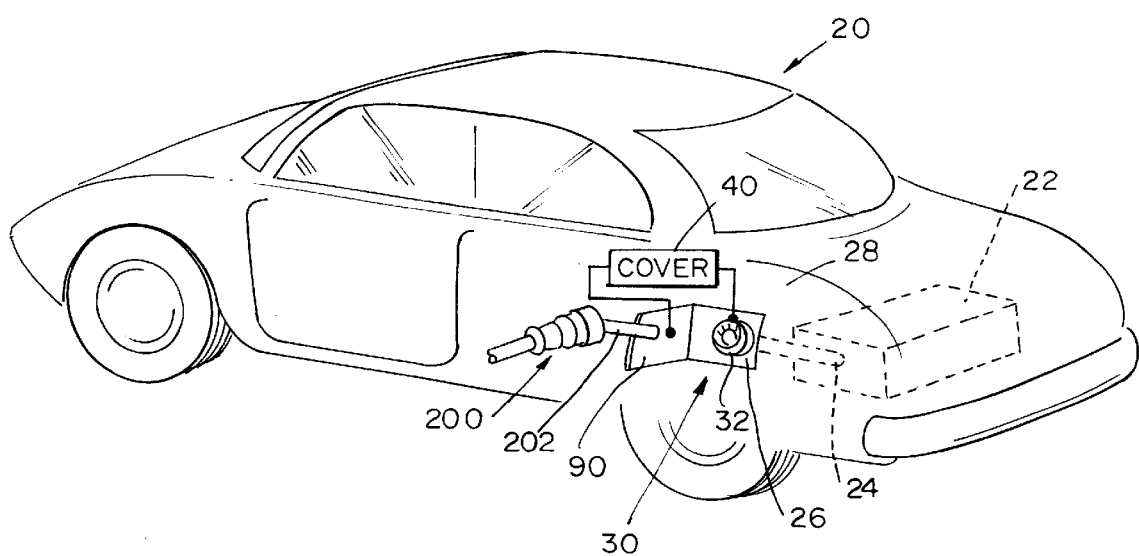
FIG. 1 is a perspective view of a vehicle showing an outer filler neck access door moved to an opened position relative to a vehicle body panel to expose a filler neck closure assembly, a diagrammatic representation of a cover coupled to the filler neck access door and movable therewith to block certain contaminants from passing through the filler neck closure assembly and into the filler neck, and a fuel-dispensing pump nozzle arranged for insertion into a filler neck through the filler neck closure assembly to dispense fuel into a filler neck (shown in phantom) coupled to a fuel tank (shown in phantom) of the vehicle.
Figure 2:
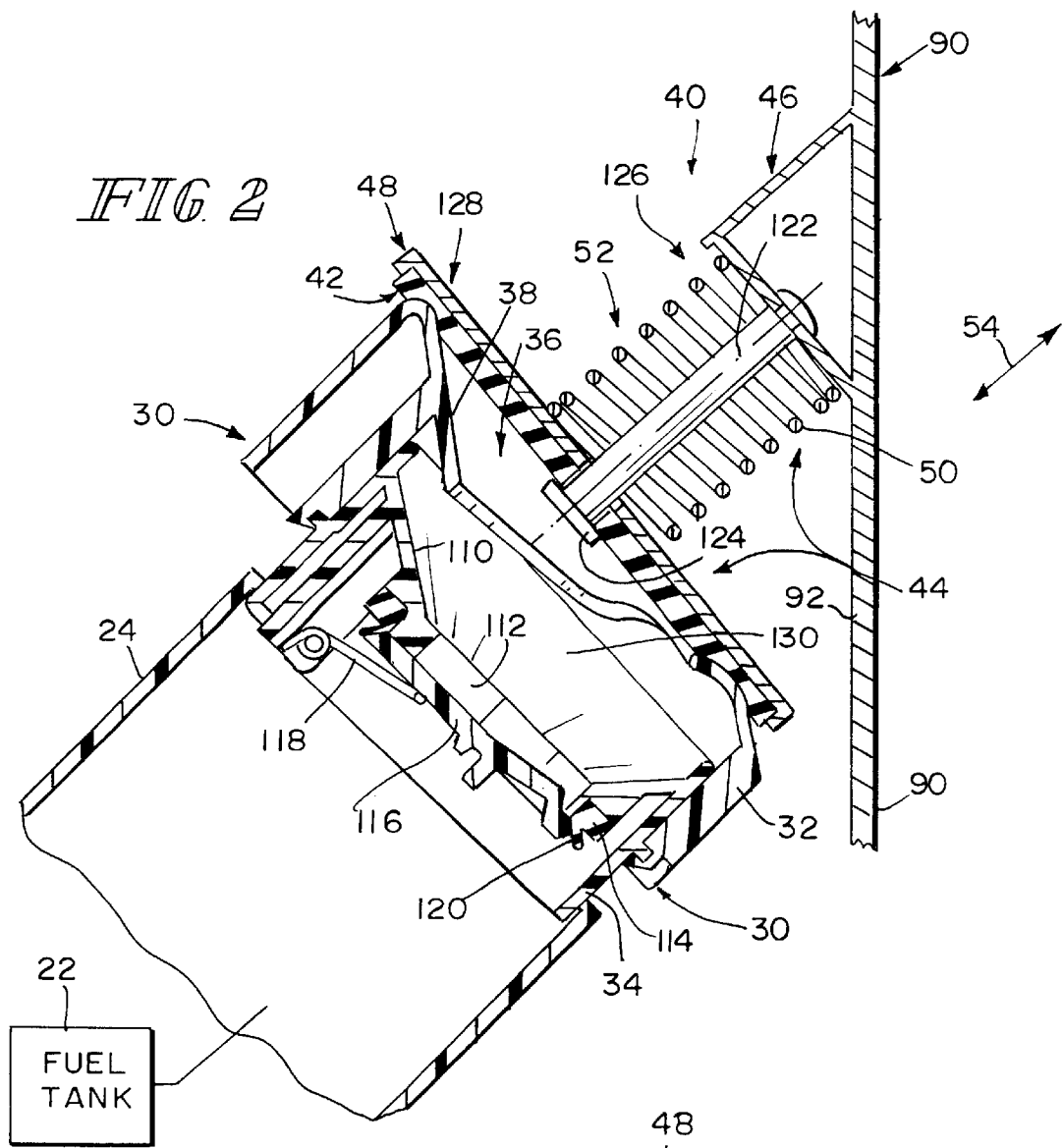
FIG. 2 is a sectional side view of a preferred embodiment of the contaminant cover of FIG. 1 showing a rubber seal sized to engage and cover an opening formed in the filler neck closure assembly and a seal support coupled to the filler neck access door and arranged to yieldably urge the rubber seal into engagement with the filler neck closure assembly upon closure of the filler neck access door.

As shown in FIGS. 1 and 2, a vehicle 20 including a fuel tank 22, a filler neck 24 extending from fuel tank 22, and an opening 26 in a side wall 28 of vehicle 20 to provide access to a filler neck closure or filler neck closure assembly 30. Closure assembly 30 includes an outer shell 32 mounted on a base 34 that is coupled to the open mouth of filler neck 24. Outer shell 32 and base 34 cooperate to define a nozzle-receiving cavity 130. Any suitable structure or apparatus such as, for example, annular beads, threads, cams, or flanges can be used to couple closure assembly 30 to filler neck 24.

A robotic refueling system 200 includes a pump nozzle 202 adapted for insertion into a nozzle-receiving opening 36 formed in outer shell 32 so that fuel can be pumped into fuel tank 22 through filler neck 24. Outer shell 32 has an inner, funnel-shaped, nozzle-guiding surface 38 formed to define nozzle-receiving opening 36. Nozzle-guiding surface 38 facilitates insertion of pump nozzle 202 into filler neck 24 for refueling. Reference is hereby made to U.S. application Ser. No. 09/367,334, which is incorporated by reference herein, for a more detailed description of a robotic refueling system and a filler neck closure assembly. Reference is also made to U.S. Pat. No. 6,189,581, which is incorporated by reference herein, for a description of another suitable filler neck closure assembly.

Base 32 includes a nozzle-guiding surface 110 that defines a nozzle-receiving aperture 112 in communication with nozzle-receiving opening 36, an elastomer seat 114, a seal or flapper door 116, and a torsion spring 118. Torsion spring 118 is configured to bias flapper door 116 into engagement with a surface 120 of elastomer seat 114 so that flapper door 116 normally blocks fuel and fuel vapor from escaping from filler neck 24 to atmosphere. Flapper door 116 is configured to move to an opened position against the bias of torsion spring 118 in response to insertion of pump nozzle 202 through nozzle-receiving aperture 112 into the open mouth of filler neck 24.

An outer appearance or access door 90 is pivotably mounted to side wall 28 of vehicle 20 as shown, for example, in FIG. 1 for motion between a closed position to block access to filler neck access opening 26 and an opened position to allow access to opening 26. An overcenter spring (not shown) can be coupled to door 90 and side wall 28 to bias access door 90 normally toward its closed position.

A contaminant cover 40 is coupled to an interior wall 92 of access door 90 and configured to cover the nozzle-receiving opening 36 formed in closure assembly 30 when access door 90 is moved to its closed position. Contaminant cover 40 blocks entry of contaminant material including rocks, dirt, pebbles, and other debris into filler neck 24 through opening 36 formed in closure assembly 30 when access door 90 is closed.

Contaminant cover 40 includes a seal 42 made of rubber or other suitable elastomeric material and sized to engage outer shell 32 and close opening 36 and urging means or a seal support 44 coupled to interior wall 92 and arranged to support seal 42 as shown, for example, in FIG. 2. Seal support 44 is configured to yieldably bias seal 42 into engagement with closure assembly 30 upon closure of access door 90 as shown, for example, in FIG. 2.

Seal support 44 includes a base 46 coupled to interior wall 92 of access door 90, a backing plate 48 coupled to an exterior surface of seal 42, a retaining pin 50 (also referred to as a retainer pin or post) coupled to each of base 46 and backing plate 48, and a spring 52 positioned to lie between base 46 and backing plate 48 and configured to yieldably urge backing plate 48 away from base 46 to cause seal 42 to seat on closure assembly 30 to compensate for variances in the position of closure assembly 30 relative to the closed access door 90 and the position of filler neck 24 in vehicle 20. Seal 42 and backing plate 48 are configured to travel on retaining pin 50 relative to base 46 in directions 54 as shown in FIG. 2. In the illustrated embodiment, spring 52 is a coiled compression spring surrounding retaining pin 50.

Base 46 and retaining pin 50 cooperate to define a connector 126. Backing plate 48 and seal 42 cooperate to define a seal unit 128.

Retaining pin 50 defines an axis 122 along which seal unit 128 travels in directions 54. Retaining pin 50 includes a stopper 124 positioned to limit how far seal unit 128 can move away from base 46.

Figure 3:
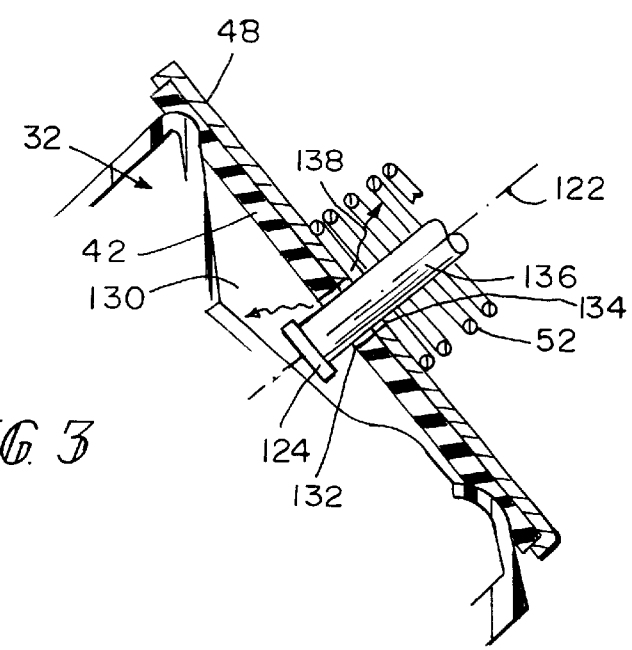
FIG. 3 is an enlarged sectional side view of the contaminant cover of FIG. 2, with portions broken away, showing a retaining pin of the seal support extending through openings formed in the seal and a backing plate of the seal support, the openings being sized to allow for atmospheric breathing between atmosphere and a cavity formed in the filler neck closure assembly when the seal seats on the filler neck closure assembly.

Seal 42 is formed to include an opening 132 and backing plate 48 is formed to include an opening 134, as shown, for example, in FIG. 3. Retaining pin 50 extends through openings 132, 134. Openings 132, 134 are sized to provide a clearance between a shaft 136 of retaining pin 50 and seal 42 and backing plate 48, as shown, for example, in FIG. 3. This allows atmospheric breathing, indicated by double-headed arrow 138, between cavity 130 and atmosphere through openings 132, 134 when seal 42 seats on outer shell 32. Seal 42 and backing plate 48 are configured to move away from stopper 124 in response to seal 42 seating on outer shell 32 to allow fluid communication between cavity 130 and atmosphere through openings 132, 134.

Although the invention has been described in detail with reference to preferred embodiments, variations and modifications exist within the scope and spirit of the invention as defined in the following claims.

What is claimed is:

1. An apparatus adapted for use with a filler neck of a vehicle, the apparatus comprising
    a filler neck access door adapted to be coupled to a side wall of the vehicle and movable between a closed position to block access to the filler neck and an opened position to allow access to the filler neck,
    a filler neck closure adapted to be coupled to an open mouth of the filler neck to close the open mouth, the filler neck closure including a first seal configured to block fuel and fuel vapor from flowing from the filler neck to atmosphere and being formed to include a nozzle-receiving opening, and
    a cover including a second seal and a seal support that is coupled to the second seal and includes a base coupled to the filler neck access door and a spring configured to bias the second seal away from the base to cause the second seal to seat on the filler neck closure to block contaminant material from entering the nozzle-receiving opening when the filler neck access door is in its closed position and to allow the second seal to move toward the base in response to the second seal seating on the filler neck closure, wherein the base is mounted onto the filler neck access door against movement relative thereto, the spring engages the base, the seal support further includes a post coupled to the base, and the spring surrounds the post.

2. The apparatus of claim 1, wherein the seal support further includes a plate coupled to the second seal and the post.

3. The apparatus of claim 2, wherein the plate and the second seal are configured to move along the post relative to the base.

4. An apparatus adapted for use with a filler neck of a vehicle, the apparatus comprising
    a filler neck access door adapted to be coupled to a side wall of the vehicle and movable between a closed position to block access to the filler neck and an opened position to allow access to the filler neck,
    a filler neck closure adapted to be coupled to an open mouth of the filler neck to close the open mouth, the filler neck closure including a first seal configured to block fuel and fuel vapor from flowing from the filler neck to atmosphere and being formed to include a nozzle-receiving opening, and
    a cover including a second seal and a seal support that is coupled to the second seal and includes a base coupled to the filler neck access door and a spring configured to bias the second seal away from the base to cause the second seal to seat on the filler neck closure to block contaminant material from entering the nozzle-receiving opening when the filler neck access door is in its closed position and to allow the second seal to move toward the base in response to the second seal seating on the filler neck closure, wherein the seal support further includes a plate coupled to the second seal and a post coupled to the base and the plate such that the plate and tie second seal are movable along the post relative to the base.

5. The apparatus of claim 4, wherein the spring engages the base and the plate and surrounds the post.

6. An apparatus adapted for use with a filler neck of a vehicle, the apparatus comprising
    a filler neck access door adapted to be coupled to a side wall of the vehicle and movable between a closed position to block access to the filler neck and an opened position to allow access to the filler neck, a filler neck closure adapted to be coupled to an open mouth of the filler neck to close the open mouth, the filler neck closure including a first seal configured to block fuel and fuel vapor from flowing from the filler neck to atmosphere and being formed to include a nozzle-receiving opening, and a cover including a second seal and a seal support that is coupled to the second seal and includes a base coupled to the filler neck access door and a spring configured to bias the second seal away from the base to cause the second seal to seat on the filler neck closure to block contaminant material from entering the nozzle-receiving opening when the filler neck access door is in its closed position and to allow the second seal to move toward the base in response to the second seal seating on the filler neck closure, wherein the seal support further includes a plate coupled to the second seal and the spring engages the plate.

7. The apparatus of claim 6, wherein the seal support further includes a post and the spring engages the base and surrounds the post.

8. An apparatus adapted for use with a filler neck of a vehicle, the apparatus comprising a filler neck access door adapted to be coupled to a side wall of the vehicle and movable between a closed position to block access to the filler neck and an opened position to allow access to the filler neck, a filler neck closure adapted to be coupled to an open mouth of the filler neck to close the open mouth, the filler neck closure including a first seal configured to block fuel and fuel vapor from flowing from the filler neck to atmosphere and being formed to include a nozzle-receiving opening, and a cover including a second seal, a base coupled to the filler neck access door, a plate coupled to the second seal, a post coupled to the base and the plate, and a spring surrounding the post and engaging the base and the plate to bias the second seal away from the base to cause the second seal to seat on the filler neck closure to block entry of contaminant material into the nozzle-receiving opening when the filler neck access door is in its closed position.

9. The apparatus of claim 8, wherein the base is mounted onto the filler neck access door against movement relative thereto and the plate and the second seal are configured to move along the post relative to the base.

10. The apparatus of claim 9, wherein the plate is positioned to lie between the second seal and the spring and the spring is positioned to lie between the plate and the base.

11. The apparatus of claim 8, wherein the second seal and the plate are configured to allow atmospheric breathing between the nozzle-receiving opening and atmosphere when the second seal seats on the filler neck closure.

12. The apparatus of claim 11, wherein the post extends through openings formed in the second seal and the plate and the openings formed in the second seal and the plate allow the atmospheric breathing to occur therethrough.

13. An apparatus adapted for use with a filler neck of a vehicle, the apparatus comprising a filler neck closure adapted to be coupled to an open mouth of the filler neck to close the open mouth, the filler neck closure including a first seal configured to block fuel and fuel vapor from flowing from the filler neck to atmosphere, a filler neck access door adapted to be coupled to a side wall of the vehicle and movable relative to the filler neck closure between an opened position to allow access to the filler neck and a closed position to block access to the filler neck, a cover including a second seal configured to seat on the filler neck closure to cover the filler neck closure when the filler neck access door is in its closed position and formed to include an opening, a seal backing plate coupled to the second seal and formed to include an opening, and a retainer pin that is supported by the filler neck access door and extends through the openings formed in the second seal and the seal backing plate to retain the second seal and the seal backing plate so that the second seal and the seal backing plate can move along the retainer pin in response to seating of the second seal on the filler neck closure.

14. The apparatus of claim 13, wherein the filler neck closure is formed to include a nozzle-receiving opening and the openings formed in the second seal and the seal backing plate are sized to allow atmospheric breathing therethrough between the nozzle-receiving opening and atmosphere when the second seal is seated on the filler neck closure.

15. The apparatus of claim 13, wherein the cover further includes a coiled compression spring engaging the seal backing plate.

16. The apparatus of claim 15, wherein the cover further includes a base coupled to the filler neck access door and the retainer pin and the coiled compression spring engages the base and surrounds the retainer pin.

17. The apparatus of claim 16, wherein the coiled compression spring is positioned to lie between the base and the seal backing plate.

* * * * *